(12) United States Patent
Yamaguchi

(10) Patent No.: US 7,609,035 B2
(45) Date of Patent: Oct. 27, 2009

(54) POWER GENERATION CONTROL DEVICE FOR CONTROLLING POWER GENERATION SYSTEM OF MOVABLE BODY AND POWER GENERATION CONTROL METHOD

(75) Inventor: Kazuhi Yamaguchi, Kobe (JP)

(73) Assignee: Fujitsu Ten Limited, Hyogo (JP)

( * ) Notice: Subject to any disclaimer, the term of this patent is extended or adjusted under 35 U.S.C. 154(b) by 305 days.

(21) Appl. No.: 11/704,932

(22) Filed: Feb. 12, 2007

(65) Prior Publication Data

US 2007/0188151 A1    Aug. 16, 2007

(30) Foreign Application Priority Data

Dec. 13, 2006 (JP) .............................. 2006-035012

(51) Int. Cl.
*H02P 11/00* (2006.01)
*H02P 9/00* (2006.01)
(52) U.S. Cl. .............................. 322/44; 322/24; 322/28
(58) Field of Classification Search ................. 290/1 R; 322/44, 38, 17, 24, 28; 307/10.1, 32
See application file for complete search history.

(56) References Cited

U.S. PATENT DOCUMENTS

| | | | | |
|---|---|---|---|---|
| 5,710,465 | A * | 1/1998 | Saito et al. ................. | 307/10.1 |
| 5,825,097 | A * | 10/1998 | Saito et al. ................. | 307/10.1 |
| 7,383,902 | B2 * | 6/2008 | Matsuzaki et al. ......... | 180/65.2 |
| 2002/0109407 | A1 * | 8/2002 | Morimoto et al. .......... | 307/10.1 |
| 2004/0163860 | A1 * | 8/2004 | Matsuzaki et al. ......... | 180/65.2 |
| 2006/0284604 | A1 * | 12/2006 | Qi et al. ..................... | 322/7 |

FOREIGN PATENT DOCUMENTS

| | | |
|---|---|---|
| JP | 4-312326 | 11/1992 |
| JP | 7-274597 | 10/1995 |
| JP | 07274597 A | * 10/1995 |
| JP | 9-66784 | 3/1997 |
| JP | 9-327199 | 12/1997 |
| JP | 2001-173481 | 6/2001 |
| JP | 2004-260903 | 9/2004 |
| JP | 2005-307974 | 11/2005 |
| JP | 2006-21600 | 1/2006 |

OTHER PUBLICATIONS

Fujiwara et al. JP 07274597 English machine translation. 1995.*

* cited by examiner

*Primary Examiner*—Julio Gonzalez
(74) *Attorney, Agent, or Firm*—Wenderoth, Lind & Ponack, L.L.P.

(57) ABSTRACT

A power generation control device enables to conduct appropriate charge control and load limitations even if a technique (charge control technique) for restricting power generation by a generator in an accelerating state of a movable body is adopted in a movable body such as a vehicle in which a technique (load limiting technique) for imposing limitations on a power supply when a quantity of suppliable electricity decreased has been adopted. The power generation control device for controlling a generator for a movable body which stores electric power in a battery comprises a unit for restricting power generation by the generator based on a battery suppliable current which can be taken out of the battery, a quantity of electricity generated by the generator, an essential supply current consumed by an electric load to which electric power must be supplied and a load working current consumed by an electric load which does not necessarily require a power supply.

6 Claims, 10 Drawing Sheets

POWER GENERATION CONTROL DEVICE FOR CONTROLLING POWER GENERATION SYSTEM OF MOVABLE BODY AND POWER GENERATION CONTROL METHOD

BACKGROUND OF THE INVENTION

1. Field of the Invention

The present invention relates to a power generation control device and a power generation control method and, more particularly, to a power generation control device for controlling a power generation system of a movable body such as a vehicle and a power generation control method.

2. Description of the Relevant Art

Techniques for controlling outputs of a generator whose drive source is an engine of a vehicle (such as a generator driven through a belt by an engine of a vehicle) according to the running state of the vehicle have been proposed. For example, in the below-mentioned Patent Documents 1-3, techniques (charge control techniques) have been disclosed, wherein power generation by a generator is restricted when a vehicle is in an accelerating state so as to reduce a load on an engine. The purpose of restrictions on power generation by a generator in an accelerating state of a vehicle so as to reduce a load on an engine is to improve fuel consumption and accelerating performance of the vehicle.

In recent years, in order to increase the comfort of users, a large number of electronic devices (such as a seat heater and a mirror heater) which have no direct relation with running of a vehicle have been mounted on the vehicle, and therefore, a load on a battery has been increased.

However, with the increased number of electronic devices for comfort, it might become impossible to realize a stable power supply to traveling safety systems such as a pre-crash safety system, a brake assist system and an air bag system.

In order to solve this problem, there is a technique (load limiting technique) wherein a power supply to comfort systems is limited based on a quantity of electricity obtained by adding a quantity of electricity generated by a generator to a current (battery suppliable current) which can be taken out of a battery so as to secure a stable power supply to traveling safety systems with high importance.

By the way, in cases where the above-described charge control technique is adopted in a vehicle in which this load limiting technique has been adopted, load limitations are imposed more than necessary, and therefore, there is a possibility that the comfort may be damaged. An example is described with FIGS. 16(a)-16(c).

A battery suppliable current $I_{BAT}$ represents a quantity of electricity which can be taken out of a battery. A quantity of electricity generated $I_{ALT}$ represents a quantity of electricity generated by a generator. A quantity of electricity obtained by adding the battery suppliable current $I_{BAT}$ and the quantity of electricity generated $I_{ALT}$ is a quantity of electricity which a vehicle can discharge. An essential supply current $I_{LD}1$ represents a quantity of electricity which is supplied to traveling safety systems, while a load working current $I_{LD}2$ represents a quantity of electricity which is supplied to comfort systems.

FIG. 16(a) shows a situation where a quantity of electricity obtained by adding the battery suppliable current $I_{BAT}$ and the quantity of electricity generated $I_{ALT}$ is larger than a quantity of electricity obtained by adding the essential supply current $I_{LD}1$ and the load working current $I_{LD}2$ in a constant speed state of the vehicle.

When the vehicle is accelerated, power generation by the generator is restricted by a 'charge control technique', and as shown in FIG. 16(b), the quantity of electricity generated $I_{ALT}$ is reduced. As a result, the quantity of electricity obtained by adding the battery suppliable current $I_{BAT}$ and the quantity of electricity generated $I_{ALT}$ becomes smaller than the quantity of electricity obtained by adding the essential supply current $I_{LD}1$ and the load working current $I_{LD}2$. When the quantity of electricity obtained by adding the battery suppliable current $I_{BAT}$ and the quantity of electricity generated $I_{ALT}$ became smaller than the quantity of electricity obtained by adding the essential supply current $I_{LD}1$ and the load working current $I_{LD}2$, the load working current $I_{LD}2$ is limited by a 'load limiting technique' as shown in FIG. 16(c).

That is, when the vehicle is in the accelerating state, power generation by the generator is restricted by the 'charge control technique' without relation with the situation of electric loads. And when the quantity of electricity generated $I_{ALT}$ by the generator became smaller, a power supply to the comfort systems is limited by the 'load limiting technique' in order to secure a stable power supply to the traveling safety systems, and therefore, there is a possibility that load limitations may be imposed more than necessary.

The Patent Document 2 has disclosed that, in a technique for cutting off power generation by a generator when a vehicle is in an accelerating state, a cutoff of power generation is prohibited when a battery voltage value is a prescribed value or less (i.e. when the battery voltage value is high, power generation is cut off). However, when the rate of operation of electronic equipment is high, resulting in a heavy electric load, there is a possibility that load limitations may be imposed more than necessary even if power generation is cut off only when the battery voltage value is high.

The Patent Document 3 has disclosed that an output of a generator is restricted when a battery charging rate is a prescribed value or more. In this case, similarly to the above-described case, when the rate of operation of electronic equipment is high, resulting in a heavy electric load, there is a possibility that load limitations may be imposed more than necessary.

[Patent Document 1] Japanese Patent Application Laid-Open Publication No. 4-312326
[Patent Document 2] Japanese Patent Application Laid-Open Publication No. 2001-173481
[Patent Document 3] Japanese Patent Application Laid-Open Publication No. 7-274597

SUMMARY OF THE INVENTION

The present invention was accomplished in order to solve the above problem, and it is an object of the present invention to provide a power generation control device and a power generation control method whereby appropriate charge control and load limitations can be conducted even if a charge control technique is adopted in a movable body such as a vehicle in which the above-described load limiting technique has been adopted.

In order to achieve the above object, a power generation control device according to a first aspect of the present invention is characterized by being a power generation control device for controlling a generator for a movable body which stores electric power in a battery, comprising an electric load monitoring unit for monitoring a quantity of load electricity consumed by a first electric load, a driving state judging unit for judging whether the movable body is in an accelerating state or not, and a power generation control unit for controlling power generation by the generator based on a battery suppliable current which can be taken out of the battery, a quantity of electricity generated by the generator, an essential supply current consumed by a second electric load to which electric power must be supplied and a load working current consumed by the first electric load which is detected by the electric load monitoring unit, when it is judged that the movable body is in the accelerating state by the driving state judging unit.

When the power generation control device according to the first aspect of the present invention is used, power generation by the generator is controlled based on the battery suppliable current, the quantity of electricity generated, the essential supply current and the load working current when it is judged that the movable body is in the accelerating state (i.e. when it is desirable to restrict power generation by the generator so as to reduce a load on an engine, from a viewpoint of improvement of fuel consumption and accelerating performance).

Thus, as shown in FIGS. 16(a) and 16(b), an event can be prevented by a restriction on power generation by the generator, where a situation in which a quantity of electricity obtained by adding a battery suppliable current $I_{BAT}$ and a quantity of electricity generated $I_{ALT}$ is larger than a quantity of electricity obtained by adding an essential supply current $I_{LD}1$ and a load working current $I_{LD}2$ is turned to a situation in which the quantity of electricity obtained by adding the battery suppliable current $I_{BAT}$ and the quantity of electricity generated $I_{ALT}$ is smaller than the quantity of electricity obtained by adding the essential supply current $I_{LD}1$ and the load working current $I_{LD}2$. That is, it is possible to prevent a situation where power generation by the generator is excessively restricted and the load working current $I_{LD}2$ is limited, resulting in load limitations more than necessary.

A power generation control device according to a second aspect of the present invention is characterized by the power generation control unit which controls power generation by the generator when it is judged that a first power generation control condition that a value obtained by subtracting the essential supply current and the load working current from the battery suppliable current is a prescribed value ($\geqq 0$) or more has been satisfied in the power generation control device according to the first aspect of the present invention.

When the power generation control device according to the second aspect of the present invention is used, power generation by the generator is controlled when a value obtained by subtracting the essential supply current and the load working current from the battery suppliable current is the prescribed value ($\geqq 0$) or more (i.e. when the essential supply current and the load working current can be covered only with the battery suppliable current without the quantity of electricity generated by the generator).

Thus, since no shortage of electricity is caused even if power generation by the generator is stopped, it is possible to prevent an event where the load working current is limited. However, there is a possibility that the battery suppliable current may decrease or that the load working current may increase with time. Therefore, it is desired that the prescribed value should be a value larger than 0 [A].

A power generation control device according to a third aspect of the present invention is characterized by comprising a masking unit for masking malfunction detection resulting from a stop of power generation by the generator when power generation by the generator is controlled by the power generation control unit in the power generation control device according to the second aspect of the present invention.

There is a possibility that the battery suppliable current may decrease or that the load working current may increase with time. Therefore, if power generation by the generator is stopped and the quantity of electricity generated by the generator is lowered to 0 [A], there is a risk that the essential supply current and the load working current cannot be covered only with the battery suppliable current, leading to load limitations.

In addition, there is a risk that a fault diagnostic apparatus with no direct relation with this power generation control system may detect a stop of power generation by the generator as a 'fault', resulting in an occurrence of some problem in controlling the movable body. For example, in a case where a lamp for informing an abnormal stop of the generator is installed, this lamp is lit up naturally. However, this lighting of the lamp is caused by appropriate power generation control and there is no fault in the generator.

When the power generation control device according to the third aspect of the present invention is used, malfunction detection resulting from a stop of power generation by the generator is masked when power generation by the generator is controlled by the power generation control unit. As a result, it is possible to prevent wrong information that there is a fault in the generator from being provided to a user even though the generator is normally working.

A power generation control device according to a fourth aspect of the present invention is characterized by the power generation control unit which controls power generation by the generator when it is judged that a second power generation control condition that a deficiency of electricity obtained by subtracting the battery suppliable current from a value obtained by adding the essential supply current and the load working current is smaller than the quantity of electricity generated by the generator has been satisfied in the power generation control device according to the first aspect of the present invention.

When the power generation control device according to the fourth aspect of the present invention is used, power generation by the generator is controlled when a deficiency of electricity obtained by subtracting the battery suppliable current from a value obtained by adding the essential supply current and the load working current is smaller than the quantity of electricity generated by the generator (i.e. when the essential supply current and the load working current can be covered by adding the quantity of electricity generated by the generator to the battery suppliable current). Thus, since power generation by the generator is controlled when there is a surplus of electricity generated, it is possible to prevent a shortage of electricity from being caused.

A power generation control device according to a fifth aspect of the present invention is characterized by the power generation control unit which controls power generation by the generator in such a manner that the quantity of electricity generated becomes a value obtained by adding a prescribed quantity of electricity ($\geqq 0$) to the deficiency of electricity or more when it is judged that the second power generation control condition has been satisfied, wherein the prescribed quantity of electricity is set based on a battery charging rate in the power generation control device according to the fourth aspect of the present invention.

When the power generation control device according to the fifth aspect of the present invention is used, power generation by the generator is restricted in such a manner that the quantity of electricity generated becomes a value obtained by adding the prescribed quantity of electricity ($\geqq 0$) to the deficiency of electricity or more when it is judged that the second power generation control condition has been satisfied (i.e. when the essential supply current and the load working current can be covered by adding the quantity of electricity generated by the generator even though the essential supply current and the load working current cannot be covered only with the battery suppliable current). Thus, it is possible to prevent load limitations from being imposed more than necessary and to appropriately restrict power generation by the generator, resulting in improvement of fuel consumption and accelerating performance.

By the way, there is a possibility that a battery suppliable current which can be taken out of a battery, a quantity of electricity generated by the generator and the like may be reflected by a battery charging rate. Therefore, if power generation by the generator is restricted without consideration of the battery charging rate, there is a risk that power generation by the generator may be restricted at an undesired time or excessively restricted.

When the power generation control device according to the fifth aspect of the present invention is used, it is possible to prevent power generation by the generator from being restricted at an undesired time or excessively restricted, since the prescribed quantity of electricity is set based on the battery charging rate.

A power generation control device according to a sixth aspect of the present invention is characterized by comprising a battery charging rate calculating unit for calculating a battery charging rate based on a battery open voltage in the power generation control device according to the fifth aspect of the present invention.

When the power generation control device according to the sixth aspect of the present invention is used, the battery charging rate is calculated based on a battery open voltage. There is a correlation between the battery open voltage and the battery charging rate as shown in FIG. 3. As a result, the battery charging rate can be appropriately obtained, and the prescribed value, the prescribed voltage and the prescribed quantity of electricity which are set based on the battery charging rate also can be appropriately set.

A power generation control device according to a seventh aspect of the present invention is characterized by comprising a battery suppliable current calculating unit for calculating the battery suppliable current based on a battery open voltage, a discharge final voltage and an internal resistance of the battery in any one of the power generation control devices according to the first to sixth aspects of the present invention.

A battery suppliable current $I_{BAT}$ which can be taken out of a battery can be obtained from a battery open voltage $V_{OPN}$, a limit voltage value (discharge final voltage $V_{LIM}$) at which the ability of the battery to discharge is lost and a battery internal resistance R as follows.

$$I_{BAT} = (V_{OPN} - V_{LIM})/R$$

When the power generation control device according to the seventh aspect of the present invention is used, the battery suppliable current is calculated based on a battery open voltage, a discharge final voltage and an internal resistance of the battery. As described above, by using the battery open voltage, the discharge final voltage and the internal resistance of the battery, the battery suppliable current can be appropriately obtained. As a result, since the battery suppliable current can be appropriately obtained, it is possible to enhance the accuracy of restrictions on power generation by the generator.

A power generation control method according to a first aspect of the present invention is characterized by being a power generation control method for controlling a generator for a movable body which stores electric power in a battery, comprising a step of monitoring a quantity of load electricity consumed by a first electric load, a step of judging whether the movable body is in an accelerating state or not, and a step of controlling power generation by the generator based on a battery suppliable current which can be taken out of the battery, a quantity of electricity generated by the generator, an essential supply current consumed by a second electric load to which electric power must be supplied and a load working current consumed by the first electric load which is detected by the electric load monitoring unit, when it is judged that the movable body is in the accelerating state.

When the power generation control method according to the first aspect of the present invention is used, power generation by the generator is controlled based on the battery suppliable current, the quantity of electricity generated, the essential supply current and the load working current when it is judged that the movable body is in the accelerating state (i.e. when it is desired that power generation by the generator should be restricted so as to reduce a load on an engine, from a viewpoint of improvement of fuel consumption and accelerating performance).

Thus, as shown in FIGS. 16(a) and 16(b), an event can be prevented by a restriction on power generation by the generator, where a situation in which a quantity of electricity obtained by adding a battery suppliable current $I_{BAT}$ and a quantity of electricity generated $I_{ALT}$ is larger than a quantity of electricity obtained by adding an essential supply current $I_{LD}1$ and a load working current $I_{LD}2$ is turned to a situation in which the quantity of electricity obtained by adding the battery suppliable current $I_{BAT}$ and the quantity of electricity generated $I_{ALT}$ is smaller than the quantity of electricity obtained by adding the essential supply current $I_{LD}1$ and the load working current $I_{LD}2$. That is, it is possible to prevent a situation where power generation by the generator is excessively restricted and the load working current $I_{LD}2$ is limited, resulting in load limitations more than necessary.

DESCRIPTION OF THE PREFERRED EMBODIMENTS

Figure 1:
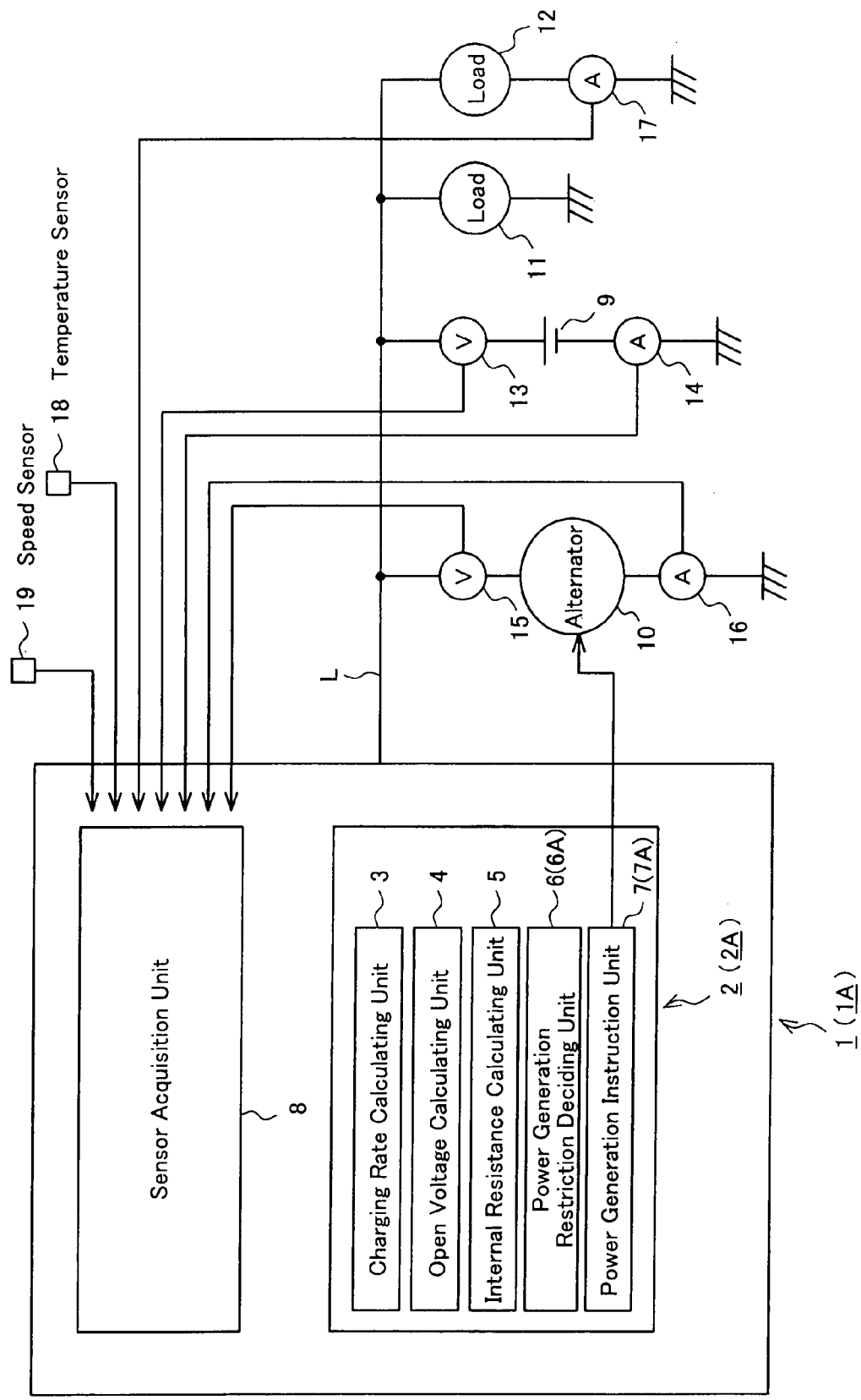
FIG. 1 is a block diagram schematically showing the principal part of a battery monitoring system comprising a power generation control device according to a first embodiment of the present invention.

The preferred embodiments of the power generation control device and the power generation control method according to the present invention are described below by reference to the Figures noted above. FIG. 1 is a block diagram schematically showing the principal part of a battery monitoring system comprising a power generation control device (or a power generation control method) according to a first embodiment of the present invention. Reference numeral 1 in FIG. 1 represents a power generation control device to be mounted on a vehicle, comprising a microcomputer 2 and a sensor acquisition unit 8 for acquiring signals from each kind of sensors. To the power generation control device 1, a power line L for supplying electric power sent from a battery 9 is connected.

The microcomputer 2 comprises a charging rate calculating unit 3 for calculating a charging rate SOC of the battery 9, an open voltage calculating unit 4 for calculating an open voltage $V_{OPN}$ of the battery 9, an internal resistance calculating unit 5 for calculating an internal resistance R of the battery 9, a power generation restriction deciding unit 6 for deciding whether power generation by an alternator 10 should be restricted or not and a power generation instruction unit 7 for regulating a power generation voltage of the alternator 10. To the power line L, not only the power generation control device 1, but also the alternator 10, an electric load 11 of systems to which power should be supplied at all times and an electric load 12 of the others are connected.

A voltage sensor 13 for detecting a battery voltage value, a current sensor 14 for detecting a battery current value, a voltage sensor 15 for detecting a power generation voltage of the alternator 10, a current sensor 16 for detecting a quantity of electricity generated by the alternator 10, a current sensor 17 for detecting a quantity of electricity (load working current) which is consumed by the electric load 12, a temperature sensor 18 for detecting a battery liquid temperature and a speed sensor 19 for detecting a speed of a vehicle are connected to the sensor acquisition unit 8. The battery voltage value, the battery current value, the output voltage of the alternator 10, the quantity of electricity generated by the alternator 10, the quantity of electricity consumed by the electric load 12, the battery liquid temperature and the speed are recognized by the power generation control device 1 (microcomputer 2). Here, the power generation control device 1 may be united with another control device into one.

Figure 2:
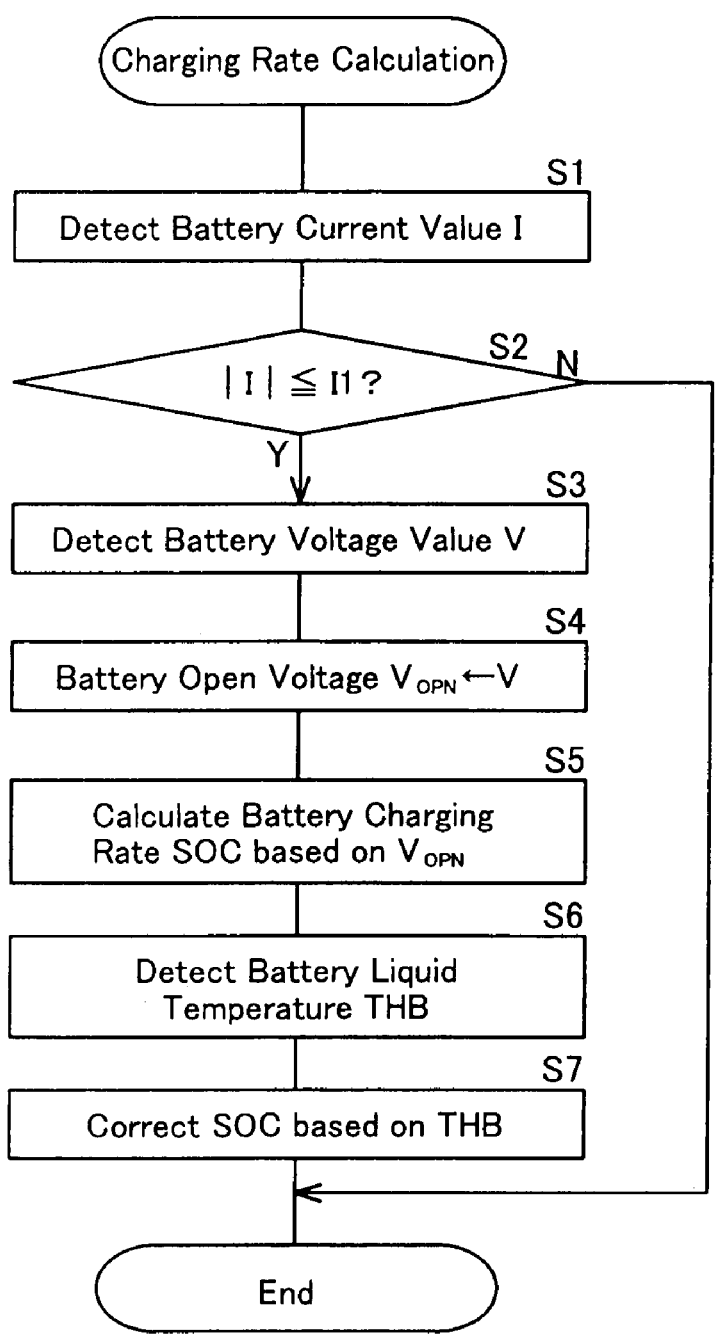
FIG. 2 is a flowchart showing a processing operation performed by a microcomputer in the power generation control device according to the first embodiment.

A processing operation [1-1] for calculating the charging rate SOC of the battery 9, performed by the microcomputer 2 in the power generation control device 1 according to the first embodiment is described below with a flowchart shown in FIG. 2. Here, this processing operation [1-1] is conducted at every prescribed interval. Based on data acquired from the current sensor 14, a battery current value I is detected (Step S1). Whether or not the battery current value I is a prescribed value I1 (e.g. 1 [A]) or less (i.e. whether or not the battery 9 is in a state of neither charging nor discharging) is judged (Step S2).

When it is judged that the battery current value I is the prescribed value I1 or less (i.e. little battery current is flowing), a battery voltage value V is detected based on data acquired from the voltage sensor 13 (Step S3). The battery voltage value V is regarded as a battery open voltage $V_{OPN}$ so as to be an updated battery open voltage $V_{OPN}$ (Step S4). On the other hand, when it is judged that the battery current value I is more than the prescribed value I1, the processing operation [1-1] is concluded at once.

The battery voltage value at the time when the battery current stopped flowing (i.e. when the battery current value is 0 [A]) becomes a battery open voltage $V_{OPN}$. Therefore, even if the battery voltage value at the time when the battery current almost stopped flowing (e.g. when the battery current value is in a range of ±1 [A]) is treated as a battery open voltage $V_{OPN}$, there is no particular problem.

Figure 3:
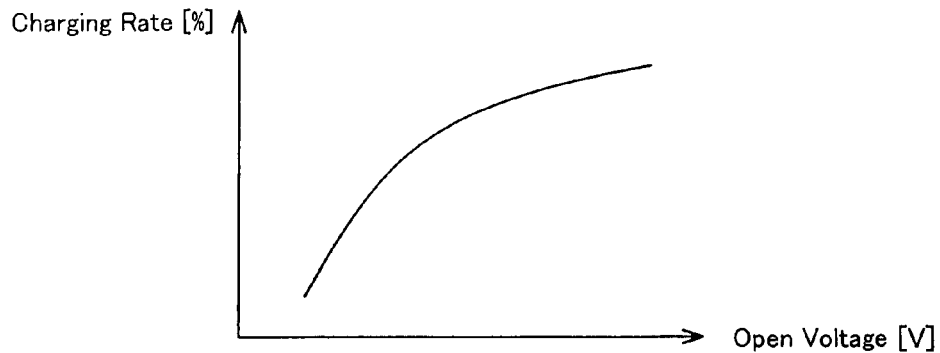
FIG. 3 is a graph showing a relation between a battery open voltage and a battery charging rate.

Based on the updated battery open voltage $V_{OPN}$, a battery charging rate SOC is calculated (Step S5). Since there is a correlation between the battery open voltage $V_{OPN}$ and the battery charging rate SOC as shown in FIG. 3, the battery charging rate SOC can be obtained from the battery open voltage $V_{OPN}$.

Based on data acquired from the temperature sensor 18, a battery liquid temperature THB is detected (Step S6). Based on the battery liquid temperature THB, a correction factor k1 is set and by multiplying the battery charging rate SOC by the correction factor k1, the battery charging rate SOC is corrected and updated (Step S7).

Figure 4:
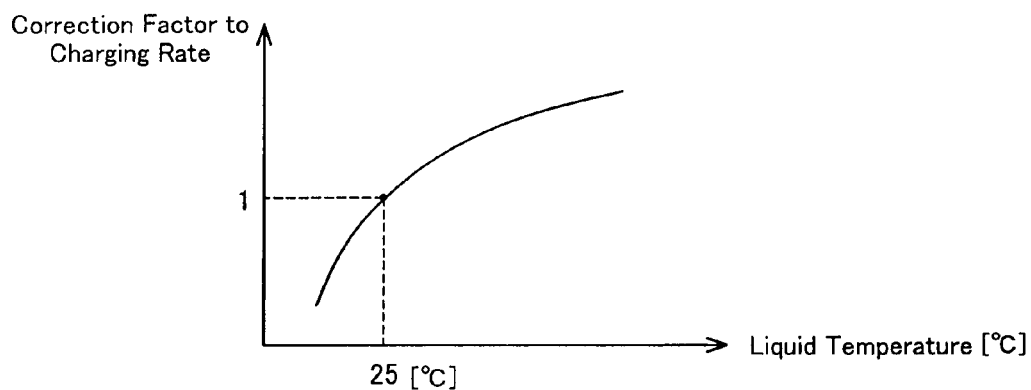
FIG. 4 is a graph showing a relation between a battery liquid temperature and a correction factor to the battery charging rate.

The battery charging rate SOC has characteristics depending on the battery liquid temperature THB as shown in FIG. 4. A reference value of the battery liquid temperature THB is 25 [° C.]. When the battery liquid temperature THB is 25 [° C.], the correction factor k1 is 1. When the battery liquid temperature THB becomes higher than 25 [° C.], the correction factor k1 becomes larger than 1. Conversely, when the battery liquid temperature THB becomes lower than 25 [° C.], the correction factor k1 becomes smaller than 1.

Figure 5:
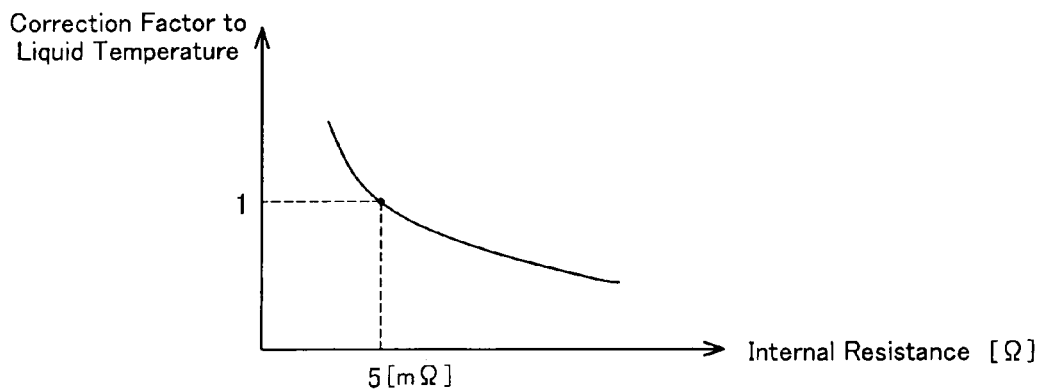
FIG. 5 is a graph showing a relation between a battery internal resistance and a correction factor to the battery liquid temperature.

In addition, the battery charging rate SOC has characteristics depending on the battery internal resistance R. When the battery charging rate SOC is corrected by taking into account both the battery liquid temperature THB and the battery internal resistance R, the battery liquid temperature THB may be corrected based on the relation between the battery internal resistance R and the battery liquid temperature THB as shown in FIG. 5 and by using the corrected battery liquid temperature THB, the correction factor k1 may be determined. For example, the battery liquid temperature THB is multiplied by a correction factor k2.

A reference value of the battery internal resistance R is 5 [m Ω]. When the battery internal resistance R is 5 [m Ω], the correction factor k2 is 1. When the battery internal resistance R becomes larger than 5 [m Ω], the correction factor k2 becomes smaller than 1. Conversely, when the battery internal resistance R becomes smaller than 5 [m Ω], the correction factor k2 becomes larger than 1.

Here, the battery internal resistance R can be obtained by monitoring the voltage sensor 13 and the current sensor 14, conducting data sampling of the battery voltage value and the battery current value, and using battery voltage values $V_1$, $V_2, \ldots, V_n$ and battery current values $I_1, I_2, \ldots, I_n$ obtained by data sampling as follows.

$$R1 = (V_2 - V_1)/(I_2 - I_1)$$
$$R2 = (V_3 - V_2)/(I_3 - I_2)$$
$$\ldots$$
$$R_{n-1} = (V_n - V_{n-1})/(I_n - I_{n-1})$$
$$R = (R1 + R2 + \ldots + R_{n-1})/(n-1)$$

Figure 6:
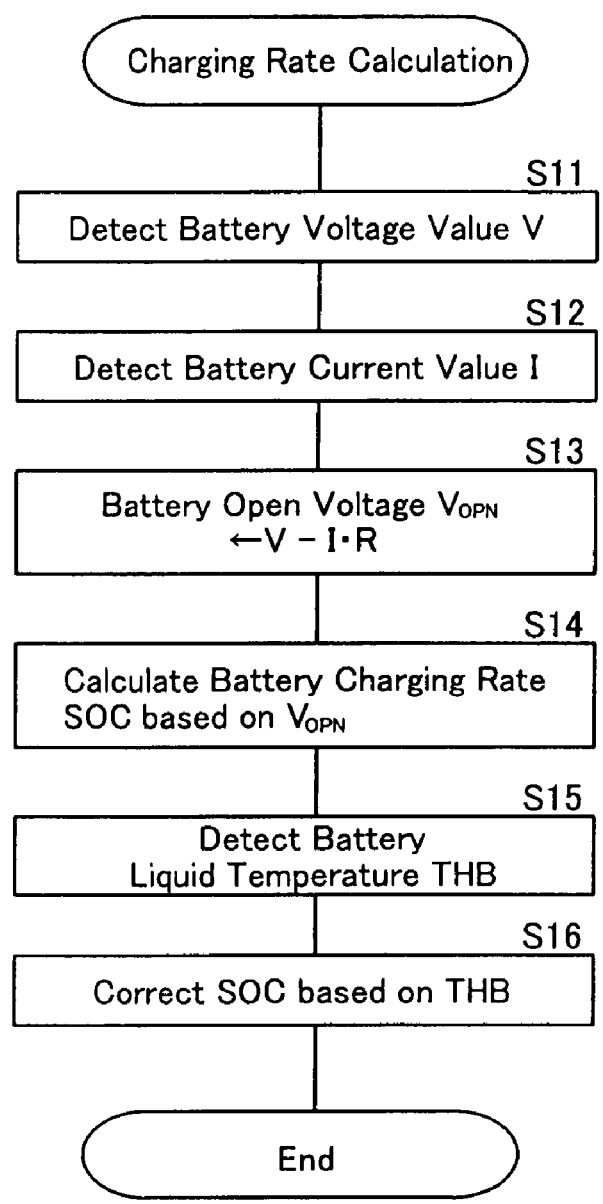
FIG. 6 is a flowchart showing a processing operation performed by the microcomputer in the power generation control device according to the first embodiment.

A processing operation [1-2] for calculating the charging rate SOC of the battery 9, performed by the microcomputer 2 in the power generation control device 1 according to the first embodiment is described below with a flowchart shown in FIG. 6. Here, this processing operation [1-2] is conducted in cases where the battery charging rate SOC has not been updated for a predetermined time or more.

A battery voltage value V is detected based on data acquired from the voltage sensor 13 (Step S11), and a battery current value I is detected based on data acquired from the current sensor 14 (Step S12). Based on the battery voltage value V, the battery current value I and a battery internal resistance R, a battery open voltage $V_{OPN}$ is calculated so as to be an updated battery open voltage $V_{OPN}$ (Step S13).

Based on the updated battery open voltage $V_{OPN}$, a battery charging rate SOC is calculated (Step S14). Since there is a correlation between the battery open voltage $V_{OPN}$ and the battery charging rate SOC as shown in FIG. 3, the battery charging rate SOC can be obtained from the battery open voltage $V_{OPN}$.

Based on data acquired from the temperature sensor 18, a battery liquid temperature THB is detected (Step S15). Based on the battery liquid temperature THB, a correction factor k1 is set and by multiplying the battery charging rate SOC by the correction factor k1, the battery charging rate SOC is corrected and updated (Step S16).

A processing operation [1-3] for controlling power generation by the alternator 10, performed by the microcomputer 2 in the power generation control device 1 according to the first embodiment is described below with flowcharts shown in FIGS. 7-9. Here, this processing operation [1-3] is conducted at every prescribed interval.

Based on data acquired from the speed sensor 19, whether the vehicle is in an accelerating state or not is judged (Step S21). When it is judged that the vehicle is in the accelerating state (i.e. one of conditions for restricting power generation by the alternator 10 has been satisfied), whether or not the battery charging rate SOC is a prescribed value SOC1 (e.g. 85%) or more is judged (Step S22). On the other hand, when it is judged that the vehicle is not in the accelerating state, the processing operation [1-3] is concluded at once.

When it is judged that the battery charging rate SOC is the prescribed value SOC1 or more (i.e. the battery charging rate SOC is high, and one of the conditions for restricting power generation by the alternator 10 has been satisfied), a quantity of electricity (load working current $I_{LD}2$) consumed by the electric load 12 is detected based on data acquired from the current sensor 17 (Step S23), and a battery suppliable current $I_{BAT}$ which can be taken out of the battery 9 is calculated (Step S24). On the other hand, when it is judged that the battery charging rate SOC is lower than the prescribed value SOC1, the processing operation [1-3] is concluded at once.

The battery suppliable current $I_{BAT}$ can be obtained from a battery open voltage $V_{OPN}$, a limit voltage value (discharge final voltage $V_{LIM}$, e.g. 6 [V]) at which the ability of the battery 9 to discharge is lost and a battery internal resistance R as follows.

$$I_{BAT} = (V_{OPN} - V_{LIM})/R$$

A surplus of electricity A obtained by subtracting an essential supply current $I_{LD}1$ (every vehicle has a fixed value) consumed by the electric load 11 to which electric power must be supplied and a load working current $I_{LD}2$ consumed by the electric load 12 from the battery suppliable current $I_{BAT}$ is calculated (Step S25). Whether or not the surplus of electricity A is 0 [A] or more is judged (Step S26).

When it is judged that the surplus of electricity A is 0 [A] or more (i.e. the essential supply current $I_{LD}1$ and the load working current $I_{LD}2$ can be covered only with the battery suppliable current $I_{BAT}$ without a quantity of electricity generated $I_{ALT}$ by the alternator 10, and a condition for restricting power generation by the alternator 10 has been satisfied), the operation goes to Step S27, wherein processing "power generation restriction 1" for restricting power generation by the alternator 10 is conducted.

Figure 8:
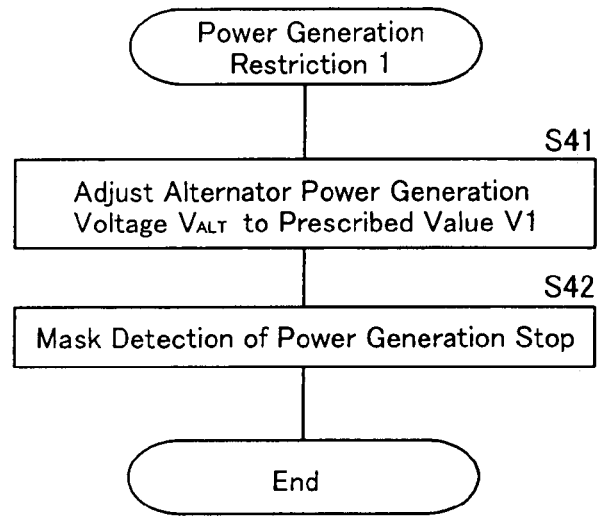
FIG. 8 is a flowchart showing a processing operation performed by the microcomputer in the power generation control device according to the first embodiment.
Figure 9:
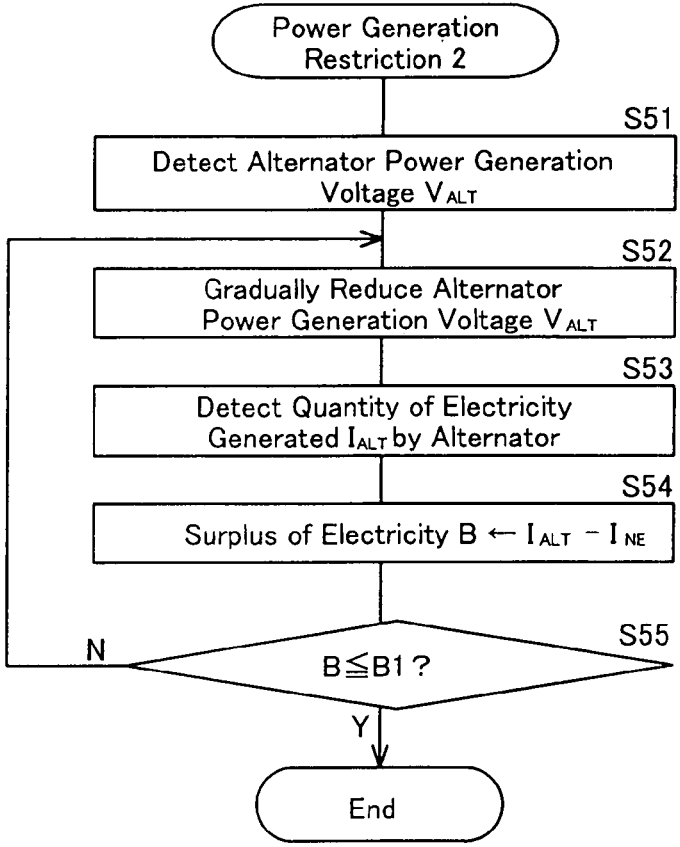
FIG. 9 is a flowchart showing a processing operation performed by the microcomputer in the power generation control device according to the first embodiment.

The processing "power generation restriction 1" is described with a flowchart shown in FIG. 8. An instruction to turn a power generation voltage $V_{ALT}$ of the alternator 10 to a prescribed value V1 (e.g. 12.5 [V]) is provided to the alternator 10 so as to restrict power generation by the alternator 10 (Step S41). Then, masking processing is conducted in order to prevent a stop of power generation by the alternator 10 from being detected as a fault (Step S42).

On the other hand, when it is judged that the surplus of electricity A is less than 0 [A] (i.e. the essential supply current $I_{LD}1$ and the load working current $I_{LD}2$ cannot be covered only with the battery suppliable current $I_{BAT}$) in Step S26 (FIG. 7), a deficiency of electricity $I_{NE}$ of the battery 9 is calculated by subtracting the battery suppliable current $I_{BAT}$ from the value obtained by adding the essential supply current $I_{LD}1$ and the load working current $I_{LD}2$ (Step S28).

A quantity of electricity generated $I_{ALT}$ by the alternator 10 is detected based on data acquired from the current sensor 16 (Step S29), and whether the quantity of electricity generated $I_{ALT}$ by the alternator 10 is larger than the deficiency of electricity $I_{NE}$ or not is judged (Step S30). When it is judged that the quantity of electricity generated $I_{ALT}$ is larger than the deficiency of electricity $I_{NE}$ (i.e. a quantity of electricity which cannot be covered with the battery suppliable current $I_{BAT}$ can be covered with the quantity of electricity generated $I_{ALT}$ by the alternator 10 and a condition for restricting power generation by the alternator 10 has been satisfied), the operation goes to Step S31, wherein processing "power generation restriction 2" for restricting power generation by the alternator 10 is conducted.

On the other hand, when it is judged that the quantity of electricity generated $I_{ALT}$ by the alternator 10 is not larger than the deficiency of electricity $I_{NE}$ (i.e. the quantity of electricity which cannot be covered with the battery suppliable current $I_{BAT}$ cannot be covered with the quantity of electricity generated $I_{ALT}$ by the alternator 10 and the condition for restricting power generation by the alternator 10 has not been satisfied), the processing operation [1-3] is concluded at once.

In this case, since the quantity of electricity obtained by adding the battery suppliable current $I_{BAT}$ and the quantity of electricity generated $I_{ALT}$ by the alternator 10 becomes smaller than the quantity of electricity obtained by adding the essential supply current $I_{LD}1$ and the load working current $I_{LD}2$, the load working current $I_{LD}2$ is limited by the 'load limiting technique' so as to secure a stable power supply to the electric load 11, as described in 'Description of the Relevant Art'.

The processing "power generation restriction 2" is described below with a flowchart shown in FIG. 9. A power generation voltage $V_{ALT}$ of the alternator 10 is detected based on data acquired from the voltage sensor 15 (Step S51). An instruction to regard the detected power generation voltage $V_{ALT}$ as a starting voltage value and gradually reduce the power generation voltage of the alternator 10 is provided to the alternator 10 so as to restrict power generation by the alternator 10 (Step S52).

A quantity of electricity generated $I_{ALT}$ by the alternator 10 is detected based on data acquired from the current sensor 16 (Step S53). By subtracting a deficiency of electricity $I_{NE}$ from the quantity of electricity generated $I_{ALT}$ by the alternator 10, a surplus of electricity B of the alternator 10 is calculated (Step S54) and whether or not the surplus of electricity B is a prescribed value B1 (e.g. 5-10 [A]) or less is judged (Step S55).

When it is judged that the surplus of electricity B is the prescribed value B1 or less (i.e. the quantity of electricity generated $I_{ALT}$ by the alternator 10 was lowered to a value obtained by adding the prescribed value B1 to the deficiency of electricity $I_{NE}$), the processing operation [1-3] is concluded since the quantity of electricity generated $I_{ALT}$ by the alternator 10 does not have to be lowered any more. On the other hand, when it is judged that the surplus of electricity B is more than the prescribed value B1, the operation returns to Step S52, wherein the power generation voltage of the alternator 10 is continuously reduced.

Here, the prescribed value B1 may be set at 0 [A], but there is a possibility that the deficiency of electricity $I_{NE}$ may increase with time due to a drop in battery suppliable current $I_{BAT}$ or a rise in load working current $I_{LD}2$ consumed by the electric load 12. Therefore, it is desirable to set the prescribed value B1 not at 0 [A] but at about 5-10 [A].

When the power generation control device according to the first embodiment is used, power generation by the alternator 10 is restricted based on the battery suppliable current $I_{BAT}$, the quantity of electricity generated $I_{ALT}$ by the alternator 10, the essential supply current $I_{LD}1$ consumed by the electric load 11 and the load working current $I_{LD}2$ consumed by the electric load 12, when it is judged that the vehicle is in the accelerating state (i.e. when it is desired that power generation by the alternator 10 should be restricted so as to reduce a load on an engine from a viewpoint of improvement of fuel consumption and accelerating performance).

Thus, an event of originally unnecessary load limitations can be prevented by a restriction on power generation by the generator 10, where a quantity of electricity obtained by adding the battery suppliable current $I_{BAT}$ and the quantity of electricity generated $I_{ALT}$ by the alternator 10 becomes smaller than a quantity of electricity obtained by adding the essential supply current $I_{LD}1$ and the load working current $I_{LD}2$, resulting in limitations on the load working current $I_{LD}2$.

A power generation control device (or a power generation control method) according to a second embodiment is described below. Here, a battery monitoring system comprising the power generation control device according to the second embodiment has the same construction as that shown in FIG. 1 except the power generation control device 1, the microcomputer 2, the power generation restriction deciding unit 6 and the power generation instruction unit 7. Therefore, a power generation control device, a microcomputer, a power generation restriction deciding unit and a power generation instruction unit are differently marked and other components are not described below.

Reference numeral 1A in FIG. 1 represents a power generation control device, comprising a microcomputer 2A and a sensor acquisition unit 8 for acquiring signals from each kind of sensors. To the power generation control device 1A, a power line L is connected in order to supply electric power sent from a battery 9.

The microcomputer 2A comprises a charging rate calculating unit 3 for calculating a charging rate SOC of the battery 9, an open voltage calculating unit 4 for calculating an open voltage $V_{OPN}$ of the battery 9, an internal resistance calculating unit 5 for calculating an internal resistance R of the battery 9, a power generation restriction deciding unit 6A for deciding whether power generation by an alternator 10 should be restricted or not and a power generation instruction unit 7A for regulating a power generation voltage of the alternator 10. The microcomputer 2A conducts the same processing operations as the processing operation [1-1] shown in FIG. 2 and the processing operation [1-2] shown in FIG. 6 performed by the microcomputer 2 in the power generation control device 1 according to the first embodiment.

A processing operation [2-3] for restricting power generation by the alternator 10, performed by the microcomputer 2A in the power generation control device 1A according to the second embodiment is described below with flowcharts shown in FIGS. 10-12. Here, this processing operation [2-3] is conducted at every prescribed interval.

Based on data acquired from a speed sensor 19, whether a vehicle is in an accelerating state or not is judged (Step S61). When it is judged that the vehicle is in the accelerating state (i.e. one of conditions for restricting power generation by the alternator 10 has been satisfied), whether or not a battery charging rate SOC is a prescribed value SOC2 (e.g. 75%) or more is judged (Step S62). On the other hand, when it is judged that the vehicle is not in the accelerating state, the processing operation [2-3] is concluded at once.

When it is judged that the battery charging rate SOC is the prescribed value SOC2 or more (i.e. the battery charging rate SOC is high to some extent, and one of the conditions for restricting power generation by the alternator 10 has been satisfied), a quantity of electricity (load working current $I_{LD}2$) consumed by an electric load 12 is detected based on data acquired from a current sensor 17 (Step S63), and a battery suppliable current $I_{BAT}$ which can be taken out of the battery 9 is calculated (Step S64). On the other hand, when it is judged that the battery charging rate SOC is less than the prescribed value SOC2, the processing operation [2-3] is concluded at once.

The battery suppliable current $I_{BAT}$ can be obtained from a battery open voltage $V_{OPN}$, a limit voltage value (discharge final voltage $V_{LIM}$, e.g. 10.5 [V]) at which the ability of the battery 9 to discharge is lost and a battery internal resistance R as follows.

$$I_{BAT}=(V_{OPN}-V_{LIM})/R$$

Figure 13:
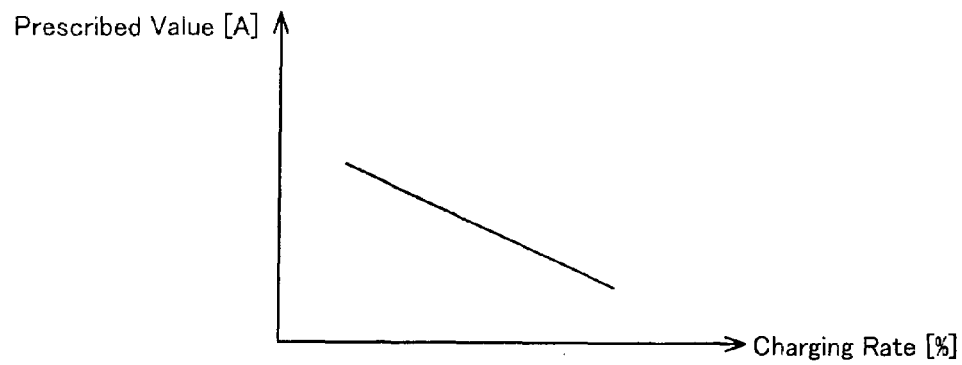
FIG. 13 is a graph showing a relation between a battery charging rate and a threshold value of surplus of electricity of the battery.

A surplus of electricity A obtained by subtracting an essential supply current $I_{LD}1$ (every vehicle has a fixed value) consumed by an electric load 11 to which electric power must be supplied and the load working current $I_{LD}2$ consumed by the electric load 12 from the battery suppliable current $I_{BAT}$ is calculated (Step S65). Based on the battery charging rate SOC, a prescribed value A1 is set by using a relation between the battery charging rate SOC and the prescribed value A1 shown in FIG. 13 (Step S66). Whether or not the surplus of electricity A of the battery 9 is the prescribed value A1 ($\geqq 0$)

or more (i.e. whether a condition for restricting power generation by the alternator 10 has been satisfied or not) is judged (Step S67). As can be seen from the graph shown in FIG. 13, the higher the battery charging rate SOC becomes, the smaller the prescribed value A1 becomes. Conversely, the lower the battery charging rate SOC becomes, the larger the prescribed value A1 becomes.

When the surplus of electricity A of the battery 9 is 0 [A] or more, the essential supply current $I_{LD}1$ and the load working current $I_{LD}2$ can be covered only with the battery suppliable current $I_{BAT}$ without the quantity of electricity generated $I_{ALT}$ by the alternator 10. However, there is a possibility that only the battery suppliable current $I_{BAT}$ may not be able to cover the essential supply current $I_{LD}1$ and the load working current $I_{LD}2$ due to a drop in battery suppliable current $I_{BAT}$ with time.

Therefore, the prescribed value A1 to be compared with the surplus of electricity A, which is used for judging whether the condition for restricting power generation by the alternator 10 has been satisfied or not, is desirably larger than 0 [A]. The battery suppliable current $I_{BAT}$ has a great relation with the battery charging rate SOC. When the battery charging rate SOC is low, the lowering speed of the battery suppliable current $I_{BAT}$ (i.e. the lowering speed of the surplus of electricity A) becomes high. Therefore, when the battery charging rate SOC is low (when the surplus of electricity A tends to get smaller), the prescribed value A1 is preferably set to be a large value.

When it is judged that the surplus of electricity A of the battery 9 is the prescribed value A1 or more (i.e. the essential supply current $I_{LD}1$ and the load working current $I_{LD}2$ can be covered only with the battery suppliable current $I_{BAT}$ without the quantity of electricity generated $I_{ALT}$ by the alternator 10, and the condition for restricting power generation by the alternator 10 has been satisfied) in Step S67, the operation goes to Step S68, wherein processing "power generation restriction 3" for restricting power generation by the alternator 10 is conducted.

Figure 11:
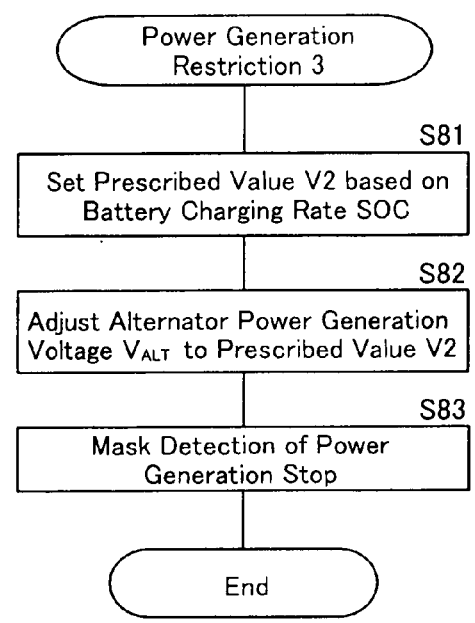
FIG. 11 is a flowchart showing a processing operation performed by the microcomputer in the power generation control device according to the second embodiment.
Figure 12:
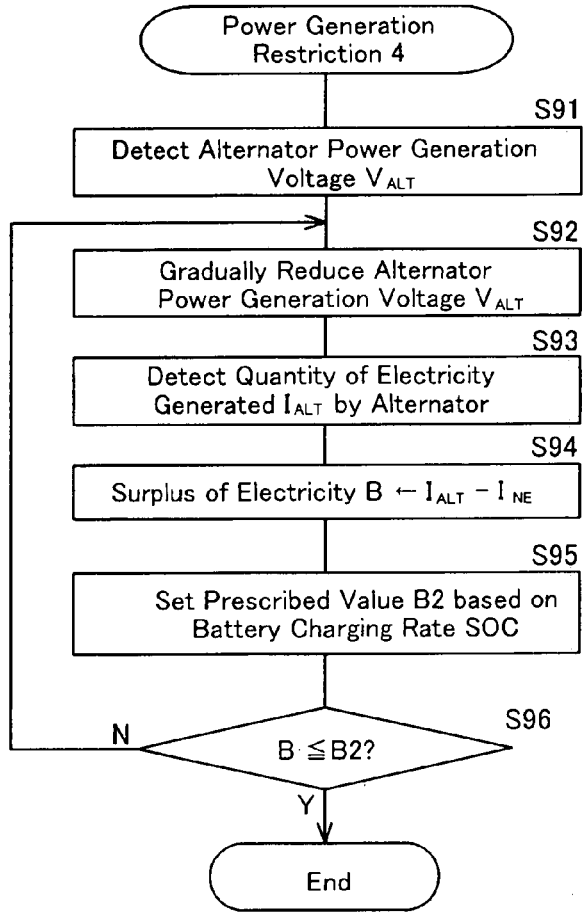
FIG. 12 is a flowchart showing a processing operation performed by the microcomputer in the power generation control device according to the second embodiment.
Figure 14:
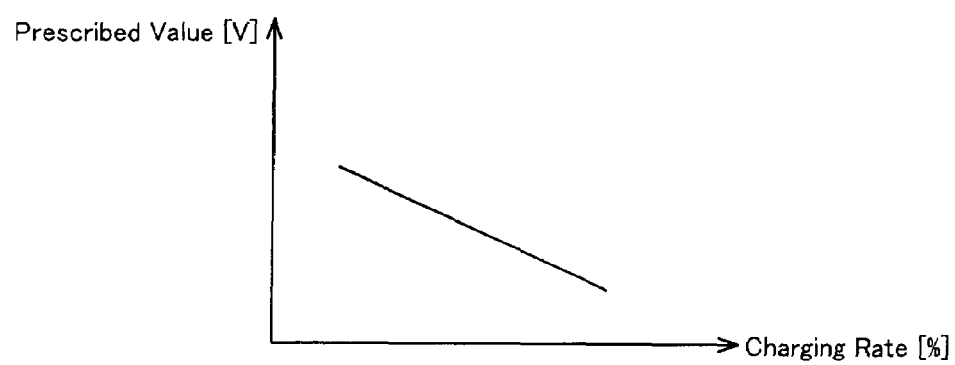
FIG. 14 is a graph showing a relation between the battery charging rate and a threshold value of power generation voltage of an alternator.

The processing "power generation restriction 3" is described with a flowchart shown in FIG. 11. Based on a battery charging rate SOC, a prescribed value V2 ($\geqq 0$ [V]) is set by using a relation between the battery charging rate SOC and the prescribed value V2 shown in FIG. 14 (Step S81). And an instruction to turn the power generation voltage $V_{ALT}$ of the alternator 10 to the prescribed value V2 is provided to the alternator 10 so as to restrict power generation by the alternator 10 (Step S82). Thereafter, masking processing is conducted in order to prevent a stop of power generation by the alternator 10 from being detected as a fault (Step S83). As can be seen from the graph shown in FIG. 14, the higher the battery charging rate SOC becomes, the smaller the prescribed value V2 becomes. Conversely, the lower the battery charging rate SOC becomes, the larger the prescribed value V2 becomes.

Since it has been judged that the surplus of electricity A of the battery 9 is the prescribed value A1 or more (i.e. the essential supply current $I_{LD}1$ and the load working current $I_{LD}2$ can be covered only with the battery suppliable current $I_{BAT}$) in Step S67 (FIG. 10), logically the prescribed value V2 may be set at 0 [V], resulting in a stop of power generation by the alternator 10. However, as described above, there is a possibility that the battery suppliable current $I_{BAT}$ may decrease with time, resulting in a smaller surplus of electricity A.

Therefore, it is desired that power generation by the alternator 10 should be restricted case by case. As described above, when the battery charging rate SOC is low, the prescribed value V2 is likely to be small. Therefore, when the battery charging rate SOC is low, the prescribed value V2 is desirably set to be a large value.

On the other hand, when it is judged that the surplus of electricity A is less than the prescribed value A1 (i.e. the condition for restricting power generation by the alternator 10 has not been satisfied) in Step S67 (FIG. 10), a deficiency of electricity $I_{NE}$ of the battery 9 is calculated by subtracting the battery suppliable current $I_{BAT}$ from a value obtained by adding the essential supply current $I_{LD}1$ and the load working current $I_{LD}2$ (Step S69).

Based on data acquired from a current sensor 16, a quantity of electricity generated $I_{ALT}$ by the alternator 10 is detected (Step S70). Whether the quantity of electricity generated $I_{ALT}$ by the alternator 10 is larger than the deficiency of electricity $I_{NE}$ or not is judged (Step S71). When it is judged that the quantity of electricity generated $I_{ALT}$ is larger than the deficiency of electricity $I_{NE}$ (i.e. a quantity of electricity which cannot be covered with the battery suppliable current $I_{BAT}$ can be covered with the quantity of electricity generated $I_{ALT}$ by the alternator 10, and a condition for restricting power generation by the alternator 10 has been satisfied), the operation goes to Step S72, wherein processing "power generation restriction 4" for restricting power generation by the alternator 10 is conducted.

On the other hand, when it is judged that the quantity of electricity generated $I_{ALT}$ by the alternator 10 is not larger than the deficiency of electricity $I_{NE}$ (i.e. the quantity of electricity which cannot be covered with the battery suppliable current $I_{BAT}$ cannot be covered with the quantity of electricity generated $I_{ALT}$ by the alternator 10, and the condition for restricting power generation by the alternator 10 has not been satisfied), the processing operation [2-3] is concluded at one.

In this case, since the quantity of electricity obtained by adding the battery suppliable current $I_{BAT}$ and the quantity of electricity generated $I_{ALT}$ by the alternator 10 becomes smaller than the quantity of electricity obtained by adding the essential supply current $I_{LD}1$ and the load working current $I_{LD}2$, the load working current $I_{LD}2$ is limited by the 'load limiting technique' so as to secure a stable power supply to the electric load 11, as described in 'Description of the Relevant Art'.

The processing "power generation restriction 4" is described below with a flowchart shown in FIG. 12. A power generation voltage $V_{ALT}$ of the alternator 10 is detected based on data acquired from a voltage sensor 15 (Step S91). An instruction to regard the detected power generation voltage $V_{ALT}$ as a starting voltage value and gradually reduce the power generation voltage of the alternator 10 is provided to the alternator 10 so as to restrict power generation by the alternator 10 (Step S92).

Figure 15:
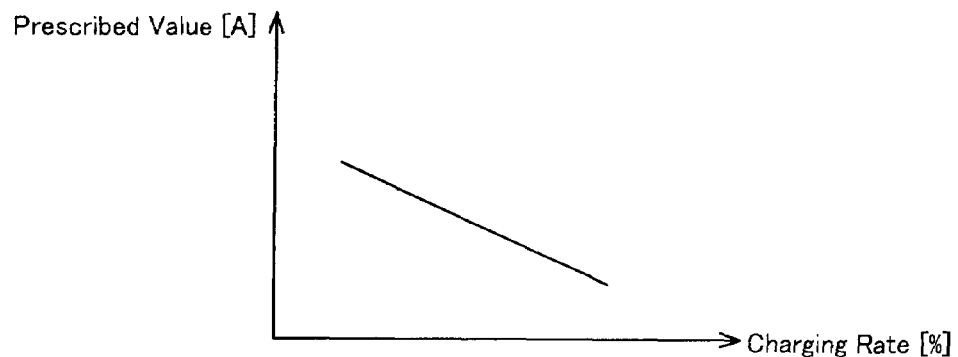
FIG. 15 is a graph showing a relation between the battery charging rate and a threshold value of surplus of electricity of the alternator.
Figure 16:
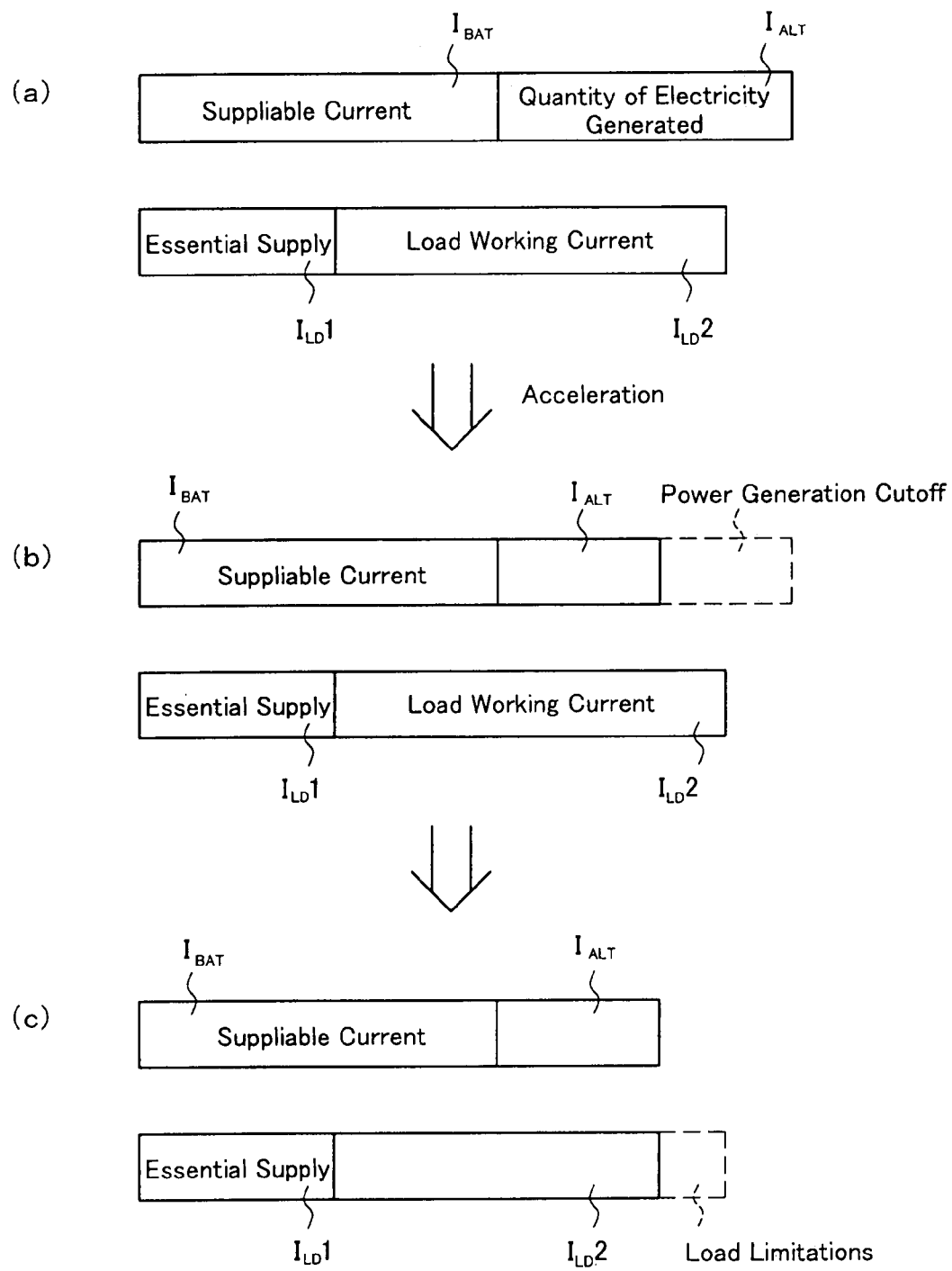
FIG. 16 is an illustration for describing a charge control technique and a load limiting technique conventionally used.

A quantity of electricity generated $I_{ALT}$ by the alternator 10 is detected based on data acquired from the current sensor 16 (Step S93). By subtracting a deficiency of electricity $I_{NE}$ from the quantity of electricity generated $I_{ALT}$ by the alternator 10, a surplus of electricity B of the alternator 10 is calculated (Step S94). And a prescribed value B2 ($\geqq 0$ [A]) is set based on a battery charging rate SOC by using a relation between the battery charging rate SOC and the prescribed value B2 shown in FIG. 15 (Step S95).

Whether or not the surplus of electricity B of the alternator 10 is the prescribed value B2 or less (i.e. whether the quantity of electricity generated $I_{ALT}$ by the alternator 10 was lowered to a value obtained by adding the prescribed value B2 to the deficiency of electricity $I_{NE}$ or not), is judged (Step S96). As can be seen from the graph shown in FIG. 15, the higher the battery charging rate SOC becomes, the smaller the prescribed value B2 becomes. Conversely, the lower the battery charging rate SOC becomes, the larger the prescribed value B2 becomes.

Since it has been judged that the quantity of electricity generated $I_{ALT}$ by the alternator 10 is larger than the deficiency of electricity $I_{NE}$ (i.e. the quantity of electricity which cannot be covered with the battery suppliable current $I_{BAT}$ can be covered with the quantity of electricity generated $I_{ALT}$ by the alternator 10) in Step S71 (FIG. 10), logically the prescribed value B2 may be set at 0 [A] and power generation by the alternator 10 may be restricted until the surplus of electricity B of the alternator 10 reaches 0 [A]. However, as described above, when the battery suppliable current $I_{BAT}$ decreases with time, the deficiency of electricity $I_{NE}$ might become larger and the surplus of electricity B might become smaller.

Therefore, it is desired that power generation by the alternator 10 should be restricted case by case. In addition, as described above, when the battery charging rate SOC is low, the deficiency of electricity $I_{NE}$ tends to become large, while the surplus of electricity B tends to become small. As a result, when the battery charging rate SOC is low (when the surplus of electricity B tends to become small), the prescribed value B2 is preferably set to be a large value.

When it is judged that the surplus of electricity B is the prescribed value B2 or less (i.e. the quantity of electricity generated $I_{ALT}$ by the alternator 10 decreased to a value obtained by adding the prescribed value B2 to the deficiency of electricity $I_{NE}$) in Step S96, the processing operation [2-3] is concluded since there is no need to lower the power generation voltage $V_{ALT}$ of the alternator 10 any more. On the other hand, when it is judged that the surplus of electricity B is more than the prescribed value B2, the operation returns to Step S92, wherein the power generation voltage of the alternator 10 is continuously reduced.

When the power generation control device according to the second embodiment is used, the prescribed value A1 to be compared with the surplus of electricity A, the prescribed value V2 which is a target for regulation of the power generation voltage $V_{ALT}$ of the alternator 10 and the prescribed value B2 to be compared with the surplus of electricity B are set based on the battery charging rate SOC, and whether power generation by the alternator 10 should be restricted or not, and to what extent it should be restricted are carefully judged. As a result, restrictions on power generation by the alternator 10 can be more appropriately conducted.

Figure 7:
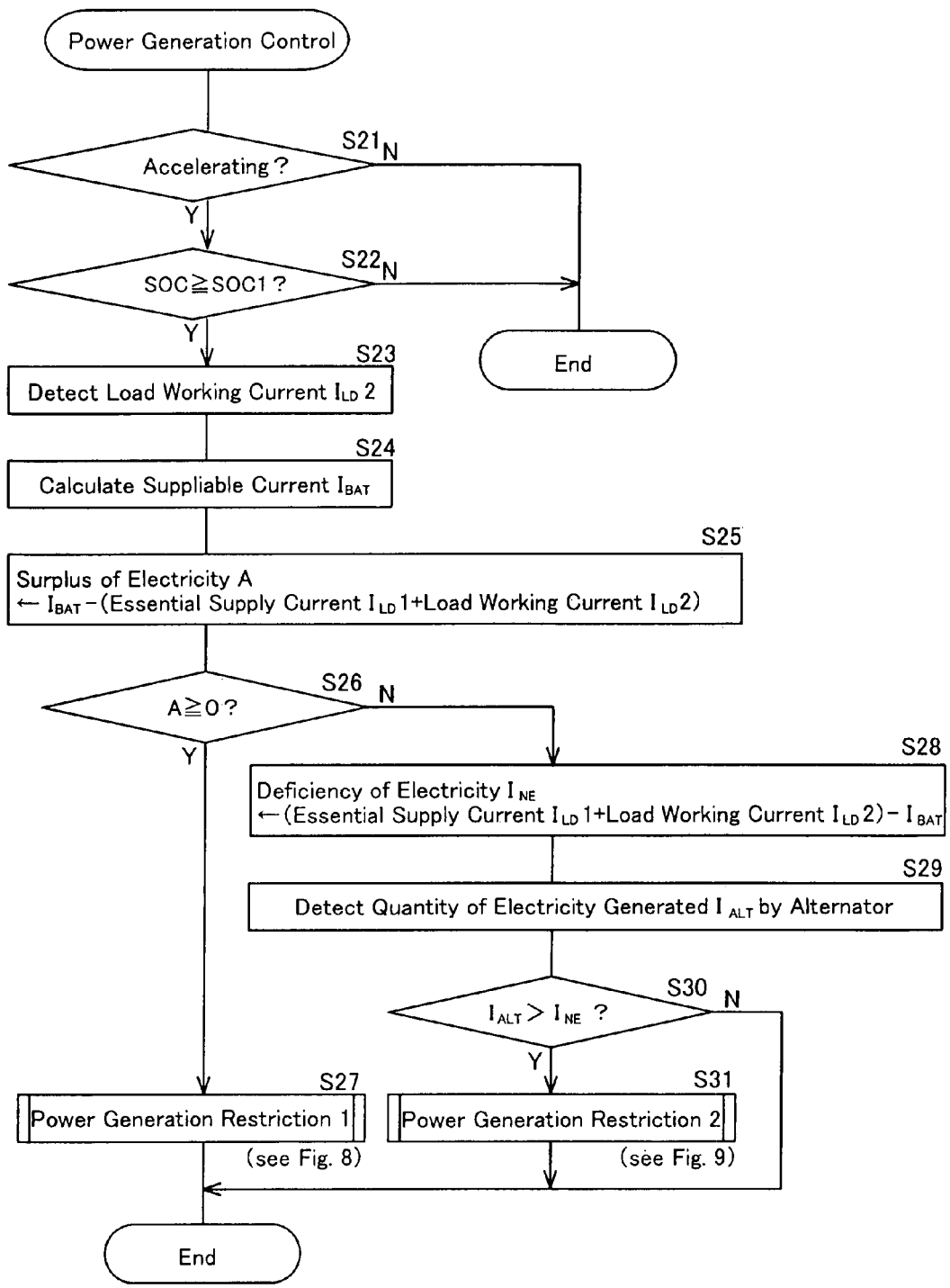
FIG. 7 is a flowchart showing a processing operation performed by the microcomputer in the power generation control device according to the first embodiment.
Figure 10:
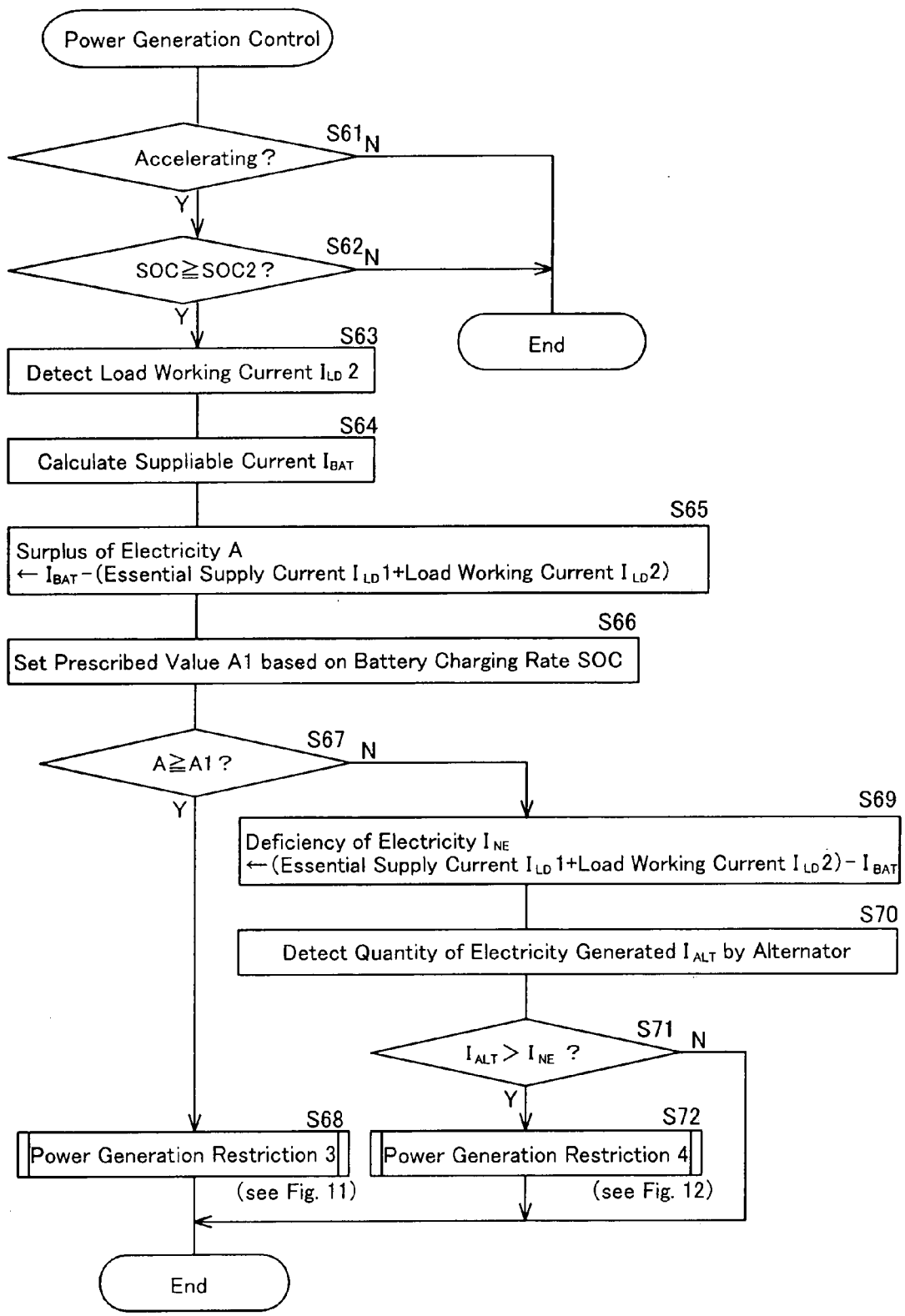
FIG. 10 is a flowchart showing a processing operation performed by a microcomputer in a power generation control device according to a second embodiment.

In the power generation control devices according to the first and second embodiments, as a first stage, whether the essential supply current $I_{LD}1$ and the load working current $I_{LD}2$ can be covered only with the battery suppliable current $I_{BAT}$ or not is judged (Step S26 of FIG. 7 and Step S67 of FIG. 10), and as a second stage, whether a quantity which cannot be covered by the battery 9 (the deficiency of electricity $I_{NE}$) can be covered with the quantity of electricity generated $I_{ALT}$ by the alternator 10 or not is judged (Step S30 of FIG. 7 and Step S71 of FIG. 10). And according to the result, the processing "power generation restriction 2" or "power generation restriction 4" is conducted. But in another embodiment, without conducting the processing at the first stage, only the processing at the second stage may be conducted and then, the "power generation restriction 2" or "power generation restriction 4" may be conducted.

What is claimed is:

1. A power generation control device for controlling a generator for a movable body which stores electric power in a battery, comprising:

an electric load monitoring unit for monitoring a quantity of load electricity consumed by a first electric load;

a driving state judging unit for judging whether the movable body is in an accelerating state or not; and a power generation control unit for controlling power generation by the generator based on a battery suppliable current which can be taken out of the battery, a quantity of electricity generated by the generator, an essential supply current consumed by a second electric load to which electric power must be supplied, and a load working current consumed by the first electric load which is detected by the electric load monitoring unit, when it is judged that the movable body is in the accelerating state by the driving state judging unit, wherein the power generation control unit controls power generation by the generator when it is judged that a first power generation control condition that a value obtained by subtracting the essential supply current and the load working current from the battery suppliable current is a prescribed value ($\geqq 0$) or more has been satisfied.

2. A power generation control device according to claim 1, comprising:

a masking unit for masking malfunction detection resulting from a stop of power generation by the generator when power generation by the generator is controlled by the power generation control unit.

3. A power generation control device for controlling a generator for a movable body which stores electric power in a battery, comprising:

an electric load monitoring unit for monitoring a quantity of load electricity consumed by a first electric load;

a driving state judging unit for judging whether the movable body is in an accelerating state or not; and a power generation control unit for controlling power generation by the generator based on a battery suppliable current which can be taken out of the battery, a quantity of electricity generated by the generator, an essential supply current consumed by a second electric load to which electric power must be supplied, and a load working current consumed by the first electric load which is detected by the electric load monitoring unit, when it is judged that the movable body is in the accelerating state by the driving state judging unit, wherein the power generation control unit controls power generation by the generator when it is judged that a second power generation control condition that a deficiency of electricity obtained by subtracting the battery suppliable current from a value obtained by adding the essential supply current and the load working current is smaller than the quantity of electricity generated by the generator has been satisfied.

4. A power generation control device according to claim 3, wherein the power generation control unit controls power generation by the generator in such a manner that the quantity of electricity generated becomes a value obtained by adding a prescribed quantity of electricity ($\geqq 0$) to the deficiency of electricity or more when it is judged that the second power generation control condition has been satisfied, and wherein the prescribed quantity of electricity is set based on a battery charging rate.

5. A power generation control device according to claim 4, comprising:

a battery charging rate calculating unit for calculating a battery charging rate based on a battery open voltage.

6. A power generation control device for controlling a generator for a movable body which stores electric power in a battery, comprising:

an electric load monitoring unit for monitoring a quantity of load electricity consumed by a first electric load;

a driving state judging unit for judging whether the movable body is in an accelerating state or not;

a power generation control unit for controlling power generation by the generator based on a battery suppliable current which can be taken out of the battery, a quantity of electricity generated by the generator, an essential supply current consumed by a second electric load to which electric power must be supplied, and a load working current consumed by the first electric load which is detected by the electric load monitoring unit, when it is judged that the movable body is in the accelerating state by the driving state judging unit; and a battery suppliable current calculating unit for calculating the battery suppliable current based on a battery open voltage, a discharge final voltage, and an internal resistance of the battery.

* * * * *